J. O. BROWN.
HAND-BINDER.

No. 190,702. Patented May 15, 1877.

WITNESSES.
J. L. Bachtel
S. A. Conrad

INVENTOR.
James O. Brown

2 Sheets—Sheet 2.

J. O. BROWN.
HAND-BINDER.

No. 190,702. Patented May 15, 1877.

WITNESSES.
J. L. Bachtel
J. A. Conrad

INVENTOR.
James. O. Brown

N. PETERS, PHOTO-LITHOGRAPHER, WASHINGTON, D. C.

UNITED STATES PATENT OFFICE.

JAMES O. BROWN, OF MASSILLON, OHIO, ASSIGNOR OF A PART OF HIS RIGHT TO EDWIN BAYLISS, PLINY F. HODGES, AND FRANÇOIS T. LOMONT, OF SAME PLACE; SAID HODGES ASSIGNOR TO SAID BAYLISS.

IMPROVEMENT IN HAND-BINDERS.

Specification forming part of Letters Patent No. 190,702, dated May 15, 1877; application filed August 9, 1875.

*To all whom it may concern:*

Be it known that I, JAMES O. BROWN, of Massillon, county of Stark, State of Ohio, have invented certain new and useful Improvements in Harvesters, of which the following is a full, clear, and exact description, reference being had to the accompanying drawing, making part of this specification, in which—

Figure 1:
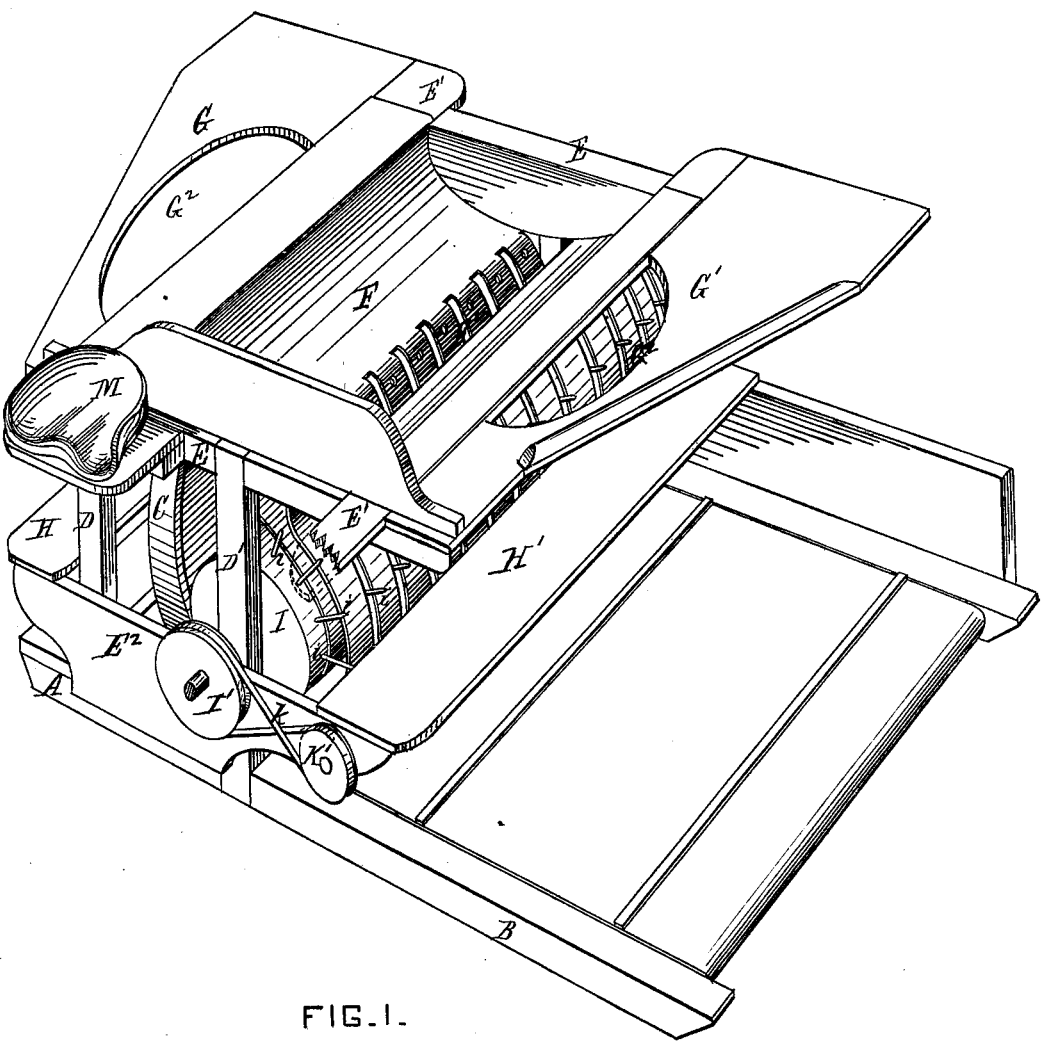
Figure 2:
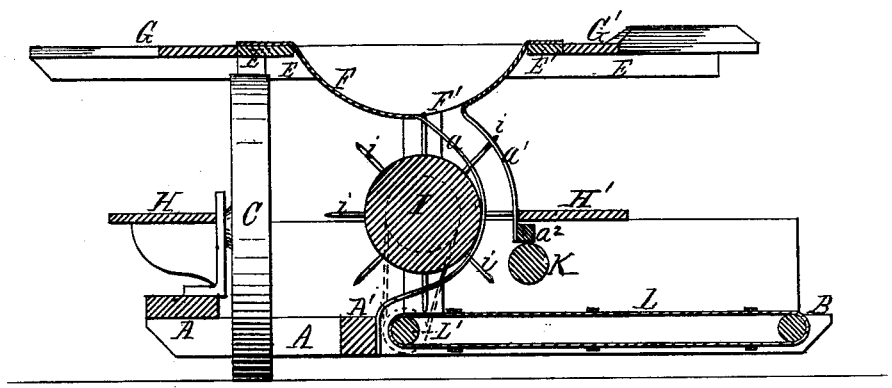
Figure 3:
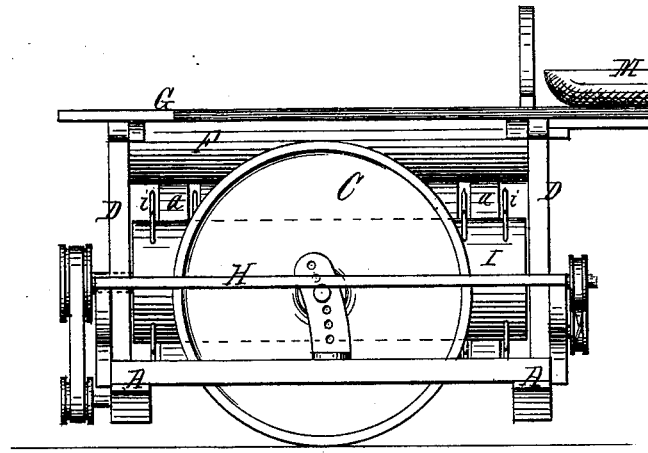

Figure 1 represents a perspective view of so much of a harvester as is necessary to show my improvements. Fig. 2 is a vertical transverse section through the same, except of the drive-wheel, which is shown in elevation; and Fig. 3 is a side elevation taken from the outer or stubble side.

Similar letters of reference denote corresponding parts wherever used.

The invention relates to that class of harvesters in which the grain is conveyed to an elevated binders' grain-receptacle, from which it is removed and bound by binders riding on the machine; and consists in a novel construction and arrangement of the elevator, consisting of a roller with spikes or teeth, and slotted surfaces, or two series of parallel strips, between which the grain is elevated by the projecting roller-teeth, as hereinafter described.

In the accompanying drawings, A represents the main frame of the machine; B, the platform-frame, and C the drive-wheel, said parts being constructed and arranged in any usual or preferred manner. The front and rear transverse bars of the main frame have uprights D D' connected with them, and these are connected at their upper ends above the plane of the drive-wheel by transverse bars E, said bars being in turn united by longitudinal bars E¹, thus forming an upright rectangular frame, within the upper end of which, at the inner or platform side of the drive-wheel, is secured the elevated concave grain-receptacle F. The transverse bars E project on either side of this concave, and form supports for the binders' tables G G¹, one upon the outer and the other upon the inner side of the drive-wheel and binders' grain-receptacle. Above the main frame, and below the bars E, transverse bars E² are attached to the uprights D D' in front and rear, and upon the projecting ends of these bars longitudinal planks H H' are secured, forming binders' stands or supports for the binders' feet, the tables G G¹ overhanging said stands being cut away on their inner sides adjacent to the concave F, as shown at G², to accommodate the legs of the binders either standing on the supports H H' or sitting on the tables G G¹. Directly underneath the concave F is a longitudinal shaft or roller, I, mounted in suitable bearings in the upright frame D D', and provided with long spikes or teeth *i* arranged in parallel rows of any desired number, by means of which the grain is elevated into the receptacle, as will be explained. The concave F has a longitudinal slit or opening, F', formed in it at or near its lowest point, and at the outer side of this opening, at a point over the highest point of the roller I, or nearly so, the concave has secured to it a number of strips, *a*, which extend down upon the inner or grain side of the roller I in curved lines eccentric thereto, but with their concave faces or sides adjacent to the roller, and in close proximity therewith. These strips extend down under and outside of the lowest point of the cylinder, or outside of the vertical plane, in which its shaft has its bearings, as shown in Fig. 2, and are there secured to a frame timber or inner platform-sill, A'. At the opposite side of the opening F' a like number of strips, *a*¹, are secured, similarly curved and united at their lower ends to a longitudinal bar, *a*², either suspended by the elastic strips, or otherwise supported in such manner as to allow it, together with the strips, to yield to the varying bulk of grain passing between them and the strips *a*. Underneath this bar *a*² is a longitudinal roller, K, mounted in bearings on the bars E², or other suitable supports, and to this roller a rotary motion inward toward the driving-wheel on its lower face is imparted by means of pulley K' and a cross-belt, *k*, from a pulley, I', on the shaft or roller I, which is rotated in an opposite direction by any convenient arrangement of belt or gearing.

L represents the endless platform apron or carrier, said apron extending at its inner end underneath the roller K, and underneath and beyond the lowest point of the toothed drum or roller I, the apron-roller L' at said inner end being mounted in bearings in close proximity to the bar A' or support for the lower ends of strips $a$, as shown in Fig. 2. By this arrangement the grain is carried by the movement of the platform-apron underneath and beyond the roller K toward or against the strips $a$, where it is met by the rotating fingers $i$, which reverse its movement and lift it against the upwardly-moving inner face of the roller K, and with the aid of the latter the grain is passed up between the two series of parallel strips $a$ and $a^1$, when the fingers, projecting through the slits in both series, effectually prevent its return, and lift it through the opening F' into the receiver F. The strips $a$ at their upper ends diverge so far from a line concentric with the drum I as to serve to strip the teeth $i$ of their load as it enters the concave, and the teeth thus pass under the concave, the grain being prevented from dropping out of the concave through the openings by the succeeding teeth and their load, thus preventing the teeth from interfering with the hands of the binders in removing the grain from the concave.

From the foregoing description it will be seen that the grain is elevated between the binders, located one upon one side of the elevator and binders' grain-receptacle, and one upon the other side thereof, said binders being also upon opposite sides of the driving-wheel in such manner that the tendency of the weight of the binder outside of the wheel to tilt or throw up the cutting apparatus and platform is counterbalanced by the weight of the other binder upon the opposite side.

The driver's seat M is placed in front of the concave and elevator upon the projecting end of one of the longitudinal bars $E^1$ or other convenient support.

The binders, standing upon the platforms H H', or sitting upon the tables G $G^1$, as explained, take the grain from the concave F alternately, and binding it upon the tables, deposit the bound bundles either upon a bundle-carrier or dumping-tray, or directly upon the ground behind the machine, as preferred.

The feet and legs of the binders may be protected from the driving-wheel upon the one side, and from the fingers $i$ projecting through between the slats $a^1$ upon the other by suitable shields for that purpose.

Such parts of a harvesting-machine as are not herein particularly described may be constructed and arranged in any usual or preferred manner.

Having now described my invention, what I claim as new, and desire to secure by Letters Patent, is—

1. The series of curved strips $a$, fastened at their upper ends to the concave grain-receptacle, and at their lower ends to a sill or bar at the inner end of the platform apron or carrier, in combination with the toothed roller I, the teeth of which protrude between the strips, substantially as and for the purpose set forth.

2. The combination, with the concave grain-receptacle, of the slotted surfaces or two series of parallel strips, $a\ a^1$, and the rollers I K, arranged and operating substantially as described.

3. The toothed elevating-drum I, in combination with the strips $a\ a^1$, between which the grain is elevated, arranged at the platform or grain side of the elevating-drum, as described.

JAMES O. BROWN.

Witnesses:
I. H. BROWN,
S. A. CONRAD.